(12) United States Patent
Shin

(10) Patent No.: US 12,172,868 B1
(45) Date of Patent: Dec. 24, 2024

(54) IoT TERMINAL AND SYSTEM OF MONITORING THE OCCURRENCE OF ABNORMAL SITUATION IN AN ELEVATOR

(71) Applicant: TETRA Co., Ltd., Seoul (KR)

(72) Inventor: Yong Wook Shin, Hwaseong-si (KR)

(73) Assignee: TETRA Co., Ltd., Seoul (KR)

( * ) Notice: Subject to any disclaimer, the term of this patent is extended or adjusted under 35 U.S.C. 154(b) by 0 days.

(21) Appl. No.: 18/757,488

(22) Filed: Jun. 27, 2024

(30) Foreign Application Priority Data

Aug. 18, 2023 (KR) .................. 10-2023-0108407

(51) Int. Cl.
| | |
|---|---|
| *G16Y 40/10* | (2020.01) |
| *B66B 1/34* | (2006.01) |
| *B66B 5/00* | (2006.01) |
| *B66B 5/02* | (2006.01) |
| *G06V 20/52* | (2022.01) |
| *G16Y 20/20* | (2020.01) |

(52) U.S. Cl.
CPC .......... *B66B 5/0012* (2013.01); *B66B 1/3461* (2013.01); *B66B 5/0031* (2013.01); *B66B 5/02* (2013.01); *G06V 20/52* (2022.01); *G16Y 20/20* (2020.01); *G16Y 40/10* (2020.01)

(58) Field of Classification Search
CPC ...... B66B 1/3415; B66B 1/3446–3461; B66B 1/3476–3492; B66B 5/00–0018; B66B 5/0031; B66B 5/0037; B66B 5/02; B66B 5/04; B66B 2201/40–403; B66B 2201/4684
See application file for complete search history.

(56) References Cited

U.S. PATENT DOCUMENTS

| | | | |
|---|---|---|---|
| 2009/0166133 A1 | 7/2009 | Tyni et al. | |
| 2020/0277159 A1* | 9/2020 | Larmuseau | ............... G01S 1/68 |

FOREIGN PATENT DOCUMENTS

| | | |
|---|---|---|
| JP | 2014-111498 A | 6/2014 |
| KR | 10-2021-0068243 A | 6/2021 |

* cited by examiner

*Primary Examiner* — Christopher Uhlir
(74) *Attorney, Agent, or Firm* — Revolution IP, PLLC

(57) ABSTRACT

IoT terminal and system of monitoring the occurrence of abnormal situation in an elevator are disclosed, wherein the system includes: an IoT terminal installed on the inside surface of an elevator and configured to detect abnormal situation in the elevator automatically and to transmitting the real-time sensing results; a control center terminal configured to receive the abnormal situation from the IoT terminal 100 in real time, to identify an abnormal situation in the elevator, and to control the abnormal situation and to propagate it in real time; an on-site personnel mobile terminal configured to receive the abnormal situation and output the abnormal situation that is propagated from the control center terminal.

3 Claims, 2 Drawing Sheets

IoT TERMINAL AND SYSTEM OF MONITORING THE OCCURRENCE OF ABNORMAL SITUATION IN AN ELEVATOR

CROSS REFERENCE TO RELATED APPLICATION

This application claims priority from Republic of Korea Patent Application No. 10-2023-0108407, filed on Aug. 18, 2023, which is hereby incorporated by reference in its entirety.

BACKGROUND

The present disclosure relates to IoT terminal and system monitoring an elevator, and, in detail, IoT terminal and system of monitoring the occurrence of abnormal situation in an elevator.

CCTV cameras are installed in the elevator, and CCTV images are generated and recorded. Through these CCTV images, various safety accidents or abnormal situations in the elevator can be checked and responded to by management personnel such as the building management office.

However, the problem is that it is not always easy for management personnel to recognize safety accidents or abnormal situations in real time. Especially in emergency situations, such as when an occupant suddenly falls down or is knocked unconscious by fire smoke, it is not easy to respond in real time.

Therefore, it is necessary to check various abnormal situation such as a fall down of an occupant, an assault, a dog safety accident, a fire smoke, etc. in the elevator in real time, and to communicate and respond closely with the occupants.

SUMMARY

An objective of the present disclosure is to provide a system of monitoring the occurrence of abnormal situation in an elevator.

Another objective of the present disclosure is to provide an IoT terminal of monitoring the occurrence of abnormal situation in an elevator.

A system of monitoring the occurrence of abnormal situation in an elevator according to the objectives of the present disclosure described above may be configured to include: an IoT terminal installed on the inside surface of an elevator and configured to detect abnormal situation in the elevator automatically and to transmitting the real-time sensing results; and a control center terminal configured to receive the abnormal situation from the IoT terminal 100 in real time, to identify an abnormal situation in the elevator, and to control the abnormal situation and to propagate it in real time.

Further, the system may be configured to further include an on-site personnel mobile terminal configured to receive the abnormal situation and output the abnormal situation that is propagated from the control center terminal.

An IoT terminal of monitoring the occurrence of abnormal situation in an elevator according to the another objective of the present disclosure described above may be configured to include: an external CCTV video real-time reception module configured to receive external CCTV video in real time from an external CCTV device installed in the elevator; an external CCTV video storage module configured to store external CCTV video received in real time from the external CCTV video real-time reception module; an abnormal situation event real-time transmission module configured to transmit abnormal situation event in real time generated by the abnormal situation event real-time generation module to control center terminal in real time.

According to the IoT terminal and system of monitoring the occurrence of abnormal situation in an elevator, since it is configured to automatically recognize abnormal situations in an elevator in real time using an AI algorithm from CCTV images, and to immediately connect a video call between the IoT terminal in the elevator and the control center terminal, whereby there is an effect that it is possible that abnormal situations or safety accidents in the elevator can be immediately identified and quickly responded to.

DETAILED DESCRIPTION

Figure 1A:
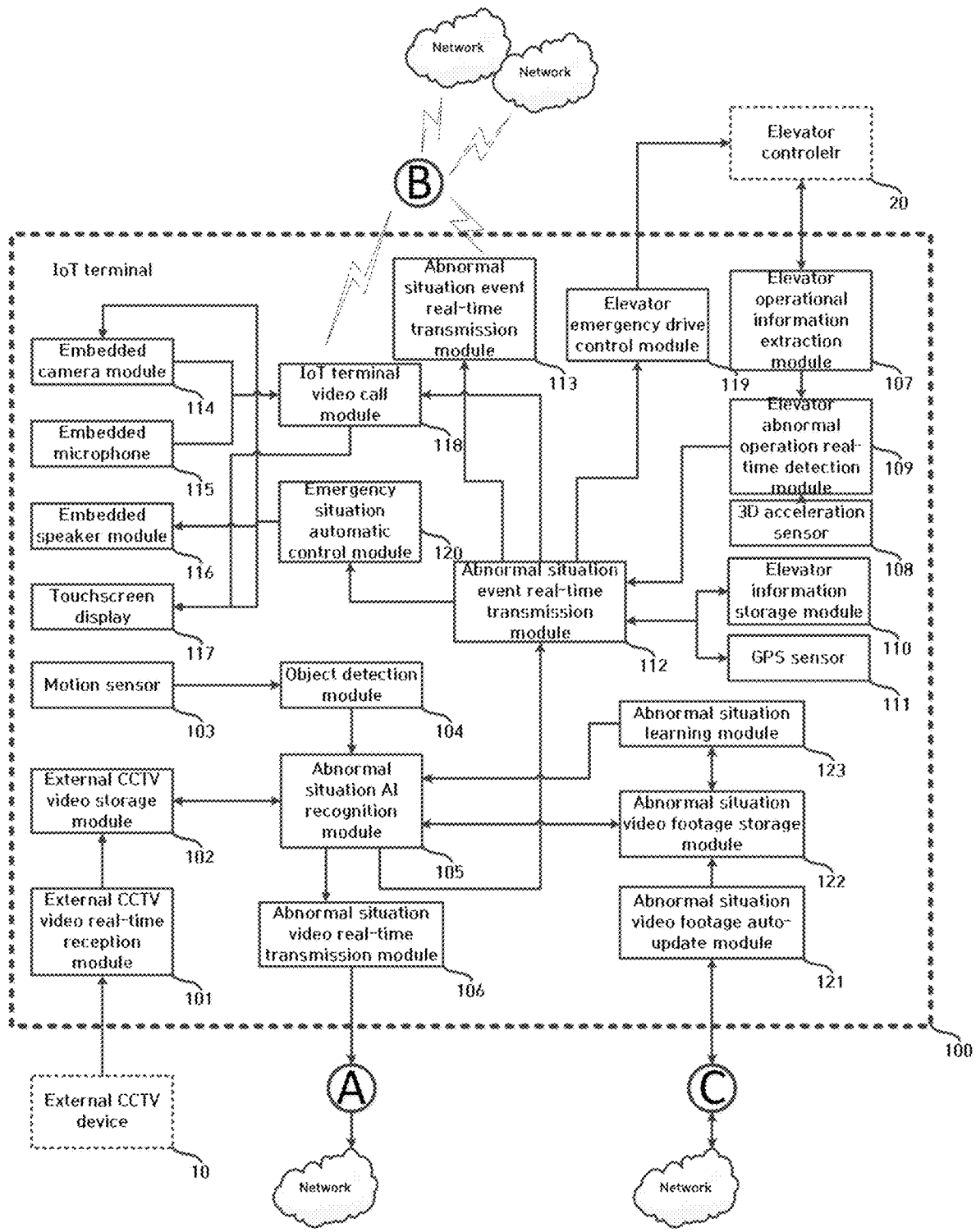
FIGS. 1A to 1B are block configuration diagrams of a system of monitoring the occurrence of abnormal situation in an elevator according to an embodiment of the present disclosure.

The present disclosure may be modified in various ways and implemented by various exemplary embodiments, so that specific exemplary embodiments are shown in the drawings and will be described in detail in the detailed description for implementing the present disclosure. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings.

Terms used in the specification, 'first', 'second', 'A', 'B', etc., may be used to describe various components, but the components are not to be construed as being limited to the terms. The terms are used only to distinguish one component from another component. For example, the first component may be named the second component, and vice versa, without departing from the scope of the present disclosure. The term 'and/or' includes a combination of a plurality of relevant items or any one of a plurality of relevant terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The terms used herein are used only for the purpose of describing particular embodiments and are not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meanings as those that are understood by those who skilled in the art. It will be further understood that terms defined in dictionaries that are commonly used should be interpreted as having meanings that are consistent with their meanings in the context of the relevant art and will not be interpreted in an idealized or overly formal sense unless expressly so defined herein.

Hereinafter, preferred embodiments of the present disclosure will be described in detail with reference to the accompanying drawings.

Figure 1B:
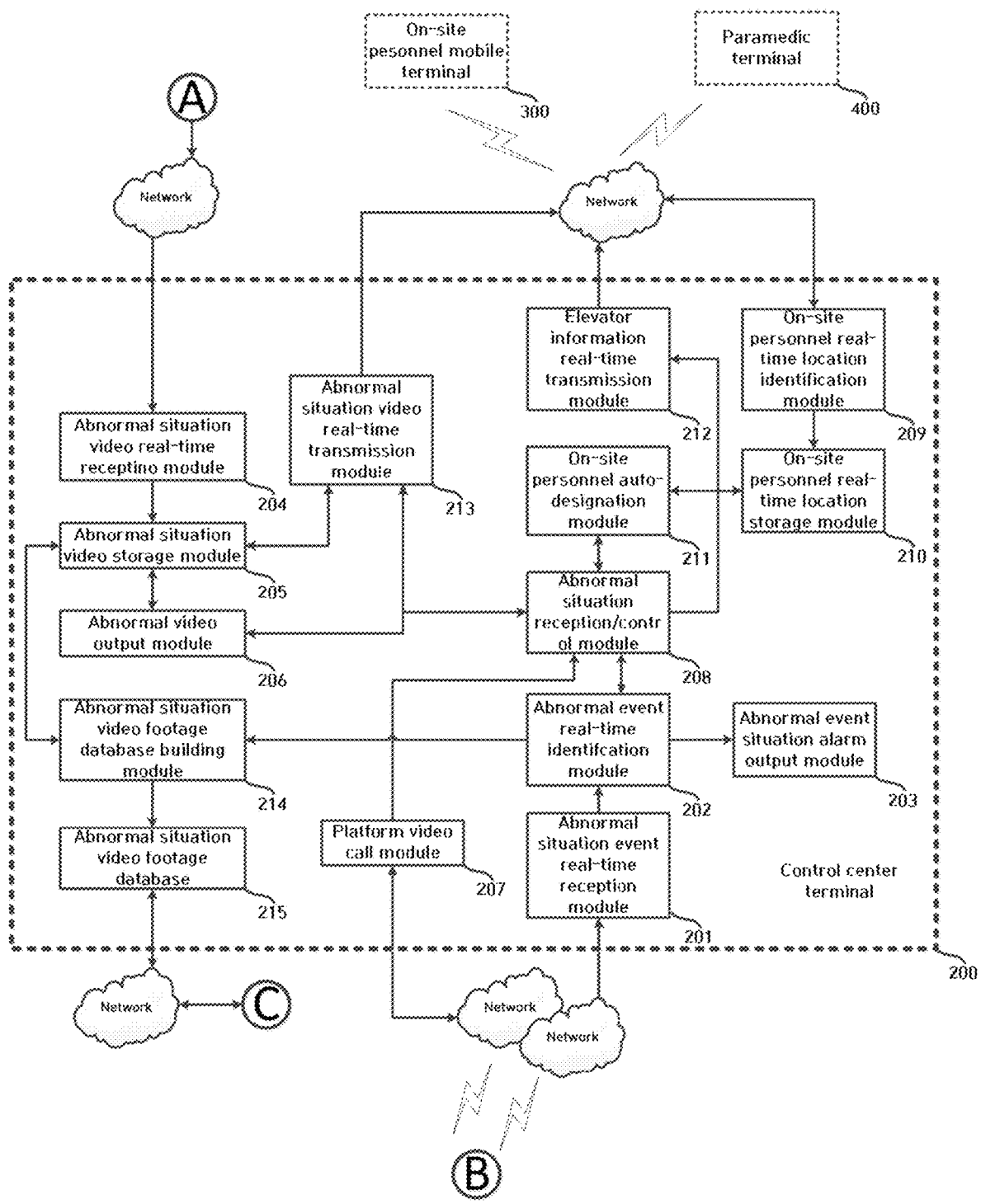

FIG. 1a to 1b are block configuration diagrams of a system of monitoring the occurrence of abnormal situation in an elevator according to an embodiment of the present disclosure.

Referring to FIG. 1a to 1b, a system of monitoring the occurrence of abnormal situation in an elevator according to one embodiment of the present disclosure may be configured to include an IoT terminal 100, a control center terminal 200, an on-site personnel mobile terminal 300, and a paramedic terminal 400.

Hereafter, detailed configuration is described.

The IoT terminal 100 is a terminal installed on the inside surface of the elevator and may be configured to automatically detect abnormal situations in the elevator in real time using an AI algorithm.

And the IoT terminal 100 may be configured to transmit the real-time detecting results to the control center terminal 200 in real time.

The abnormal situations may include a fall down of an occupant, an assault, a fire smoke, an on-board of pet dog.

The IoT terminal 100 may be configured to include an external CCTV video real-time reception module 101, an external CCTV video storage module 102, a motion sensor 103, an object detection module 104, an abnormal situation AI recognition module 105, an abnormal situation video real-time transmission module 106, An elevator operational information extraction module 107, a 3D acceleration sensor 108, an elevator abnormal operation real-time detection module 109, an elevator information storage module 110, a GPS sensor 111, an abnormal situation event real-time generation module 112, an abnormal situation event real-time transmission module 113, an embedded camera module 114, an embedded microphone 115, an embedded speaker module 116, a touchscreen display 117, an IoT terminal video call module 118, an elevator emergency drive control module 119, an emergency situation automatic control module 120, an abnormal situation video footage auto-update module 121, an abnormal situation video footage storage module 122, an abnormal situation learning module 123.

Hereafter, detailed configuration is described.

The external CCTV video real-time reception module 101 may be configured to receive external CCTV video in real-time from an external CCTV device 10 installed in the elevator.

The external CCTV video storage module 102 may be configured to store external CCTV video received in real time from the external CCTV video real-time receiving module 101.

The motion sensor 103 may be configured to detect motion of occupants, pets, or fire smoke within the elevator.

The object detection module 104 may be configured to detect an object based on the detection of the motion sensor 103, i.e., it may be configured to determine whether the object is a person, a pet, or fire smoke.

The abnormal situation AI recognition module 105 may be configured to recognize abnormal situation of the object detected by the object detection module 104 in the external CCTV video stored in the external CCTV video storage module 102 using an AI algorithm. In other words, the abnormal situation AI recognition module 105 may be configured to recognize an occupant falling down, the occurrence of fire smoke, an assault by an occupant, etc. through video analysis.

Further, the abnormal situation AI recognition module 105 may be configured to recognize an abnormal situation by analyzing the voice of the occupant picked up through the built-in microphone 115 using an AI algorithm. For example, an abnormal situation may be detected by a voice saying "help me", "save me" or a scream.

The abnormal situation video real-time transmission module 106 may be configured to transmit the corresponding abnormal situation video of the external CCTV video to the control center terminal 200 in real time, when the abnormal situation is recognized by the abnormal situation AI recognition module 105.

The elevator operational information extraction module 107 may be configured to extract elevator operational information from the elevator controller 20 installed in the elevator. The elevator controller 20 is a configuration that is already installed in the elevator to control the operation of the elevator.

The 3D acceleration sensor 108 may be configured to detect acceleration of the elevator.

The elevator abnormal operation real-time detection module 109 may be configured to detect abnormal operation of the elevator in real time using the elevator operation information extracted from the elevator operation information extraction module 107 and the acceleration detected by the 3D acceleration sensor 108.

The elevator abnormal situation real-time detection module 109 may be configured to detect elevator starts and stops using the 3D acceleration detected by the 3D acceleration sensor 108. Further, the elevator abnormality real-time detection module 109 may be configured to estimate the current floor of the elevator by tracking the change in acceleration of the 3D acceleration sensor 108.

For example, if the elevator is supposed to travel from the first floor to the fifteenth floor according to the elevator operation information extracted by the elevator operation information extraction module 107, and it is estimated by the 3D acceleration that the elevator is stopping after rising from the first floor to the eighth floor, the elevator abnormal situation real-time detection module 109 may detect that the elevator is abnormally operating.

The elevator information storage module 110 may be configured to store the elevator information including the building address of the elevator, the elevator number, and a map of the elevator's installation location in the building. If the building is very large and has many elevators, such as in an airport or train station, accurate information including the elevator number and a map of the elevator's location in the building is required.

The GPS sensor 111 may be configured to detect a GPS location of the elevator.

If an abnormal situation is recognized by the abnormal situation AI recognition module 105, An abnormal situation event real-time generation module 112 may be configured to generate an abnormal situation event in real time that includes at least one of the elevator information stored in the elevator information storage module 110 and the GPS location detected by the GPS sensor 111, the current floor, and the abnormal operation detected in real time by the elevator abnormal operation real-time detection module 109 or at least one of the abnormal situation recognized by the abnormal situation AI recognition module 105.

In this case, an abnormal situation event could be a fall down of an occupant, an assault of an occupant, etc. and an abnormal operation could be a suspension of the elevator operation.

Further, the abnormal situation event may include an abnormal situation, an abnormal operation, elevator information, a GPS location of the elevator, current floor estimated by the elevator abnormal operation real-time detection module 109.

The abnormal situation event real-time transmission module 113 may be configured to transmit abnormal situation event in real time generated by the abnormal situation event real-time generation module 112 to the control center terminal 200 in real time.

The embedded camera module 114 may be configured to be embedded in the IoT terminal 100.

The embedded microphone 115 may be configured to be embedded in the IoT terminal 100.

The embedded speaker module 116 may be configured to be embedded in the IoT terminal 100.

The touchscreen display 117 may be configured to be provided on the IoT terminal 100.

An IoT terminal video call module 118 configured to automatically perform a video call with the control center terminal 200 using the embedded camera module 114 the embedded microphone 115, the embedded speaker module 116 and the touchscreen display 117, when an abnormal situation event is generated by the abnormal situation event real-time generation module 112.

Through a video call with a control center representative, the occupant can provide specific information about the current abnormal situation or abnormal operation and request help. A control center personnel can also get a detailed view of the current situation on the elevator via video call and can receive and respond to the abnormal situation.

If an abnormal event is generated by the abnormal event real-time generation module 112, the elevator emergency drive control module 119 may be configured to provide emergency drive control of the elevator controller 20.

The emergency situation automatic control module 120 may be configured to automatically control the embedded camera module 114, the embedded speaker module 115, and the touchscreen display 117 corresponding to the emergency drive control of the elevator emergency drive control module 120, when an abnormal situation event is generated by the abnormal situation event real-time generation module 112.

Specifically, if an abnormal event is generated by the abnormal event real-time generation module 112, the elevator emergency drive control module 119 may be configured to control the elevator controller 20 to move to the boarding waiting floor or first floor and open the elevator doors to remain open, depending on the abnormal situation event.

For example, in the event of a fall down of an occupant, an assault of an occupant, the elevator emergency drive control module 119 may move to a boarding floor or a crowded ground floor and hold the elevator doors open so that they can be easily spotted by occupants waiting to board or passersby. Independently of the video call with the control center terminal 200, the elevator can be automatically forced to start on an emergency basis. In this case, the elevator emergency drive control module 119 may receive a signal from the elevator controller 20, such as a button press on another floor or a button press inside the elevator, and may be controlled to recognize but not execute the signal, and to prioritize the execution of the elevator emergency drive control module 119 over the execution of the elevator controller 20.

The emergency situation automatic control module 120 may be controlled by the elevator emergency operation control module 119 to control the elevator controller 20 to output a call for help voice corresponding to the abnormal situation through the embedded speaker module 116 or to output an alarm sound while the elevator door remains open. In the event that an occupant falls unconscious or is assaulted, an alarm tone can be output to draw the attention of those waiting to board or those on the ground floor, and a corresponding call for help voice for the fall or assault can be output loudly.

The abnormal situation video footage auto-update module 121 may be configured to receive and automatically update abnormal situation video footage from the control center terminal 200.

The abnormal situation video footage is a learning material for recognizing abnormal situations using an AI algorithm, and is learned by periodically receiving big data of abnormal situation videos uploaded by other elevators from the control center terminal 200.

The abnormal video footage storage module 122 may be configured to store abnormal situation video footage that is automatically updated by the abnormal video footage auto-update module 121.

The abnormal situation learning module 123 may be configured to learn abnormal situation in the elevator using abnormal situation video footage stored in the abnormal situation video footage storage module 122. And the abnormal situation AI recognition module 105 may be configured to recognize abnormal situations in the elevator based on the learning results of the abnormal situation learning module 123.

Such learning can further improve the abnormal situation recognition capabilities of the abnormal situation AI recognition module 105 and enable it to accurately recognize a variety of previously unrecognized abnormal situations.

For example, if one of the occupants take a dangerous object, such as a knife, out of a bag, the knife may be detected by the external CCTV images and an abnormal situation may be quickly detected. In such a case, the elevator emergency drive control module 119 can immediately force the elevator doors to open at the current floor immediately, allowing the other occupants to escape. In the case of fire smoke, the elevator door can also be immediately forced open at the current floor stop to allow occupants to evacuate.

Furthermore, if a pet dog is on board and is supposed to be held by the owner, but is not, the AI algorithm can recognize when this is not the case, and the emergency situation automatic control module 120 can immediately output a voice prompting the owner to hold the dog through the embedded speaker module 116.

In another example, when an elevator is traveling with only an occupant or only a pet dog, fatal accidents to the pet dog often occur when the pet dog's lead is trapped between the elevator doors. In such cases, an AI algorithm may be used to accurately recognize whether a lead is caught between the elevator doors, and the elevator emergency drive control module 119 may control the elevator controller 20 to stop the operation of the elevator and force the elevator doors to remain open.

The control center terminal 200 may be configured to receive an abnormal situation event from the IoT terminal 100 in real time to identify an abnormal situation in the elevator, and may be configured to control the abnormal situation and propagate it in real time to the on-site personnel mobile terminal 300 or the paramedic terminal 400.

The control center could be the control center of the building's management office, the control center of an elevator maintenance company, etc.

The control center terminal 200 may be configured to include an abnormal situation event real-time reception module 201, an abnormal event real-time identification module 202, an abnormal event situation alarm output module 203, an abnormal situation video real-time reception module 204, an abnormal situation video storage module 205, an abnormal video output module 206, a platform video call module 207, an abnormal situation reception/control module 208, an on-site personnel real-time location identification module 209, an on-site personnel real-time location storage module 210, an on-site personnel auto-designation module 211, an elevator information real-time transmission module 212, an abnormal situation video real-time transmission module 213, an abnormal situation video footage database building module 214, an abnormal situation video footage database 215.

Hereafter, detailed configuration is described.

The abnormal event real-time receiving module 201 may be configured to receive abnormal situation event in real time that is transmitted from the abnormal event real-time transmission module 113.

The abnormal situation event real-time identification module 202 may be configured to identify the abnormal situation event received in real time from the abnormal situation event real-time reception module 201.

The abnormal event real-time identification module 202 can accurately identify the elevator information, GPS location, abnormal situations, abnormal operations, etc. contained in the abnormal situation event.

The abnormal event alarm output module 203 may be configured to output the corresponding abnormal situation event alarm in real time based on the real-time identification results of the abnormal event real-time identification module 202. The abnormal event alarms allow the control center personnel to know in real time which abnormal event has occurred in which elevator.

The abnormal situation video real-time reception module 204 may be configured to receive abnormal situation video in real time transmitted by the abnormal situation video real-time transmission module 113.

The abnormal event video storage module 205 may be configured to store the abnormal situation video received in real time from the abnormal situation video real-time reception module 201.

The abnormal situation video output module 206 may be configured to output abnormal situation video stored in the abnormal situation video storage module 205 in real time. The abnormal situation video may provide a control center personnel with a specific and detailed visual perception of the abnormal situation.

The platform video call module 207 may be configured to automatically perform video calls with the IoT terminal video call module 118. Through the real-time video call with the elevator occupant, the control center personnel can see the specific situation directly through the video call, and can provide necessary guidance or psychological reassurance to the occupant.

The abnormal situation reception/control module 208 may be configured to receive and control the abnormal situation based on the real-time identification results of the abnormal situation event real-time identification module 202 and the results of the video call performed on the platform video call module 202. The control center personnel may accurately identify the abnormal situation, receive it, and control it.

The on-site personnel real-time localization module 209 may be configured to automatically determine the real-time location of the on-site personnel mobile terminal 300.

The on-site personnel real-time location storage module 210 may be configured to store the real-time location determined by the on-site personnel real-time location identification module 209.

The on-site representative auto-designation module 211 may be configured to automatically designate an on-site personnel using real-time location and elevator information of the abnormal situation stored in the on-site personnel real-time location storage module 210. In this case, it may be configured to automatically designate an on-site personnel at a location closest to the elevator.

The on-site personnel location information real-time transmission module (not shown in FIG. 1a to 1b) may transmit the real-time location determined by the on-site personnel real-time localization module 209 for the on-site personnel automatically designated by the on-site personnel auto-designation module 211 to the IoT terminal 100, and the on-site personnel real-time location reception module (not shown in FIG. 1a to 1b) of the IoT terminal 100 may be configured to receive the real-time location of the on-site personnel and to output the real-time location to the touch-screen display 117.

The elevator information real-time transmission module 212 may be configured to transmit elevator information based on the real-time identification results of the abnormal situation event real-time identification module 202 in real-time to an automatically designated on-site operator mobile terminal 300 or paramedic terminal 400 from the on-site operator auto-designation module 211. The on-site personnel or paramedic can view the elevator information to quickly navigate to the appropriate elevator.

The abnormal situation video real-time transmission module 213 may be configured to transmit abnormal situation video stored in the abnormal situation video storage module 205 in real time to an automatically designated on-site personnel mobile 300 terminal or paramedic terminal 400 from the on-site personnel auto-designation module.

The abnormal situation video footage database building module 214 may be configured to build a database by generating abnormal situation video footage based on the real-time identification results of the abnormal situation event real-time identification module 202 and abnormal situation video stored in the abnormal situation video storage module 205.

The abnormal situation video footage database 215 may be configured to be built by the abnormal situation video footage generated by the abnormal video footage database building module 214.

The on-site personnel mobile terminal 300 may be configured to receive the abnormal situation and output the abnormal situation that is propagated from the control center terminal 200.

The paramedic terminal 400 may be configured to receive and output abnormal situation in the elevator that is propagated from the control center terminal 200.

The IoT terminal 100 may comprise a built-in battery (not shown in FIG. 1a to 1b), and may be powered by a power source of the built-in battery (not shown in FIG. 1a to 1b). The built-in battery may be configured to be charged by receiving power from the elevator.

If the elevator's power source fails and the interior of the elevator is dark, the external CCTV device 10 and the elevator controller 20 may not be able to operate. This may make it difficult to do an AI video analysis through external CCTV images. In such a case, a separate backup light (not shown in FIG. 1*a* to 1*b*) that is powered by the internal battery (not shown in FIG. 1*a* to 1*b*) may be additionally provided inside the elevator, and the external CCTV device 10 may be configured to be powered by the internal battery (not shown in FIG. 1*a* to 1*b*).

If the separate backup light is turned on, darkening the interior of the elevator and making it difficult to detect objects or analyze the video, the abnormal situation AI recognition module 105 may be configured to automatically adjust the contrast of the exterior CCTV images until the existing objects are detected again, and then analyze it.

An elevator application may be pre-installed on the occupant mobile terminal (not shown in FIG. 1*a* to 1*b*). The elevator application may run in a background mode, and may be configured to detect the elevator's elevation immediately by acceleration detection of an acceleration sensor (not shown in FIG. 1*a* to 1*b*) pre-embedded in the occupant mobile terminal (not shown in FIG. 1*a* to 1*b*) and automatically launch the elevator application.

After the elevator application is launched, the elevator application may be configured to initiate a video call via speaker to the control center terminal 200 immediately upon pressing the emergency button on the elevator application when various abnormal situations described above occur. In the event that the automatic detection of the IoT terminal 100 fails or is at risk of failing to detect, the occupant may urgently call for assistance.

Further, if an occupant feels threatened or uneasy by another occupant, pressing the watch button of the elevator application may cause an attention signal to be sent to the control center terminal 200 as an alarm output, and the control center terminal 200 may be configured to automatically request, receive, and execute an external CCTV images of the elevator to the IoT terminal 100.

In this case, the occupant's elevator may be automatically identified by contrasting the GPS location transmitted by the elevator application to the control center terminal 200 with the GPS location of each elevator pre-registered with the control center terminal 200. The control center personnel can view the corresponding external CCTV images before a danger occurs and, if necessary, make a video call via the occupant mobile terminal (not shown in FIG. 1*a* to 1*b*) or the corresponding IoT terminal 100.

Although the present disclosure was described above with reference to exemplary embodiments, it should be understood that the present disclosure may be changed and modified in various ways by those skilled in the art, without departing from the spirit and scope of the present disclosure described in claims.

The invention claimed is:
1. System of monitoring an occurrence of abnormal events in an elevator, the system comprising:
an IoT terminal installed on a inside surface of an elevator and configured to detect abnormal situation in the elevator automatically and to transmitting real-time detection results;
a control center terminal configured to receive the abnormal situation from the IoT terminal in real time, to identify an abnormal situation in the elevator, and to control the abnormal situation and to propagate it in real time;
an on-site personnel mobile terminal configured to receive the abnormal situation and output the abnormal situation that is propagated from the control center terminal;
an occupant mobile terminal with pre-installed elevator application running in background mode,
wherein the IoT terminal includes:
an external CCTV video real-time reception module configured to receive external CCTV video in real time from an external CCTV device installed in the elevator;
an external CCTV video storage module configured to store external CCTV video received in real time from the external CCTV video real-time reception module;
a motion sensor configured to detect motion of occupants, pets or fire smoke in the elevator;
an object detection module configured to detect an object based on the detection of the motion sensor;
an abnormal situation AI recognition module configured to recognize abnormal situation of the object detected by the object detection module in the external CCTV video stored in the external CCTV video storage module using an AI algorithm;
an elevator operational information extraction module configured to extract elevator operational information from an elevator controller installed in the elevator;
a 3D acceleration sensor configured to detect acceleration of the elevator;
an elevator abnormal operation real-time detection module configured to estimate a current floor of the elevator by tracking a change in acceleration of the 3D acceleration sensor, and to detect abnormal operation of the elevator in real time by comparing the estimated current floor with a destination floor in the elevator operation information extracted from the elevator operation information extraction module;
an elevator information storage module configured to store elevator information including the building address of the elevator, an elevator number, and a map of the elevator's installation location in the building;
a GPS sensor configured to detect a GPS location of the elevator;
an abnormal situation event real-time generation module configured to generate an abnormal situation event in real time that includes at least one of the elevator information stored in the elevator information storage module and the GPS location detected by the GPS sensor, the current floor, and the abnormal operation detected in real time by the elevator abnormal operation real-time detection module or at least one of the abnormal situation recognized by the abnormal situation AI recognition module;
an abnormal situation event real-time transmission module configured to transmit abnormal situation event in real time generated by the abnormal situation event real-time generation module to the control center terminal in real time;
an embedded camera module configured to be embedded in the IoT terminal;
an embedded microphone configured to be embedded in the IoT terminal;
an embedded speaker module configured to be embedded in the IoT terminal;
a touchscreen display configured to be provided on the IoT terminal;
an IoT terminal video call module configured to automatically perform a video call with the control center terminal using the embedded camera module the embedded microphone, the embedded speaker module and the touchscreen display, in response to an abnormal situation event being generated by the abnormal situation event real-time generation module;
Wherein the control center terminal includes:
an abnormal situation event real-time reception module configured to receive abnormal situation event in real time that is transmitted from the abnormal event real-time transmission module;
an abnormal event real-time identification module configured to identify the abnormal situation event received in real time from the abnormal situation event real-time reception module;
a platform video call module configured to automatically perform video calls with the IoT terminal video call module;
an abnormal situation reception/control module configured to receive and control the abnormal situation based on the real-time identification results of the abnormal situation event real-time identification module and the video call performed on the platform video call module;
an on-site personnel real-time location identification module configured to automatically determine the real-time location of the on-site personnel mobile terminal;
an on-site personnel real-time location storage module configured to store the real-time location determined by the on-site personnel real-time location identification module;
an on-site personnel auto-designation module configured to automatically designate an on-site personnel using real-time location and elevator information of the abnormal situation stored in the on-site personnel real-time location storage module;
an on-site personnel location information real-time transmission module configured to transmit the real-time location determined by the on-site personnel real-time localization module for the on-site personnel automatically designated by the on-site personnel auto-designation module to the IoT terminal,
wherein the IoT terminal further includes:
an on-site personnel real-time location reception module configured to receive the real-time location of the on-site personnel transmitted from the on-site personnel location information real-time transmission module,
wherein the touchscreen display is configured to output the real-time location of the on-site personnel received by the on-site personnel real-time location reception module,
wherein the elevator abnormal operation real-time detection module configured to estimate the current floor of the elevator by tracking the change in acceleration of the 3D acceleration sensor,
wherein the abnormal situation event is configured to include an abnormal operation, elevator information, a GPS location of the elevator, current floor estimated by the elevator abnormal operation real-time detection module,
wherein the IoT terminal further includes:
a separate backup light configured to turn on, the in response to a power source failing;
a built-in battery configured to provide the separate backup light,
wherein an abnormal situation AI recognition module is configured to automatically adjust a contrast of exterior CCTV images until the object is detected again, and analyze the abnormal situation, in response to the separate backup light being turned or darkening the interior of the elevator is making it difficult to detect objects or analyze the video,
wherein the occupant mobile terminal is configured to detect the elevator's elevation immediately by acceleration detection of the 3D acceleration senor, and to automatically launch the elevator application that in response to the elevator's elevation being detected, and to cause an attention signal to be sent to the control center terminal, upon pressing a watch button of the elevator application,
wherein the control center terminal is configured to immediately output an alarm in response to receiving the attention signal from the occupant mobile terminal, and to automatically identify the occupant's elevator by contrasting the GPS location transmitted by the elevator application to the control center terminal with the GPS location of each of the elevator pre-registered with the control center terminal, and to view the corresponding external CCTV images and to make a video call via the occupant mobile terminal or the corresponding IoT terminal,
wherein the occupant mobile terminal is configured to detect the elevator's elevation immediately by acceleration detection of the 3D acceleration senor, and to automatically launch the elevator application in response to the elevator's elevation being detected, and to initiate a video call to the control center terminal immediately upon pressing the emergency button on the elevator application.

2. The system of claim 1,
wherein the IoT terminal is configured to includes:
An abnormal situation video real-time transmission module configured to transmit the corresponding abnormal situation video of the external CCTV video to the control center terminal in real time, in response to the abnormal situation being recognized by the abnormal situation AI recognition module;
An elevator emergency drive control module configured to provide emergency drive control of the elevator controller, in response to the abnormal situation event being generated by the abnormal situation event real-time generation module;
An emergency situation automatic control module configured to control the embedded camera module, the embedded speaker module, and the touchscreen display corresponding to the emergency drive control of the elevator emergency drive control module automatically, in response to the abnormal situation event being generated by the abnormal situation event real-time generation module;
An abnormal situation video footage auto-update module configured to receive and automatically update abnormal situation video footage from the control center terminal;
An abnormal situation video footage storage module configured to store abnormal situation video footage that is automatically updated by the abnormal video footage auto-update module;
An abnormal situation learning module configured to learn abnormal situation in the elevator using abnormal situation video footage stored in the abnormal situation video footage storage module;
wherein the abnormal situation AI recognition module is configured to recognize an abnormal situation in the elevator based on the learning results of the abnormal situation AI learning module, wherein the elevator emergency drive control module is configured to receive a signal of a button press on another floor from the elevator controller, and not to execute the signal but to recognize the signal, and to prioritize the execution of the elevator emergency drive control module over the execution of the recognized signal of the elevator controller, wherein the abnormal situation AI recognition module is configured to recognize whether a pet dog is being held by the occupant in response to the pet dog being on board, wherein the emergency situation automatic control module is configured to output a voice prompting the occupant to hold the dog through the embedded speaker module, wherein the abnormal situation AI recognition module is configured to recognize whether a leash is caught between the elevator doors, in response to the pet dog not being held by the occupant, wherein the elevator emergency drive control module is configured to stop operation of the elevator and force the elevator doors to remain open, in response to the leash being caught between the elevator doors.

3. The system of claim 2, wherein the control center terminal further includes:
    an elevator information real-time transmission module configured to transmit elevator information based on the real-time identification results of the abnormal situation event real-time identification module in real time to an automatically designated on-site personnel mobile terminal by the on-site personnel auto-designation module;
    an abnormal situation video real-time transmission module configured to transmit abnormal situation video stored in the abnormal situation video storage module in real time to an automatically designated on-site personnel mobile terminal from the on-site personnel auto-designation module;
    an abnormal situation video footage database building module configured to build a database by generating abnormal situation video footage based on the real-time identification results of the abnormal situation event real-time identification module and abnormal situation video stored in the abnormal situation video storage module;
    an abnormal situation video footage database configured to be built by the abnormal situation video footage generated by the abnormal video footage database building module.

\* \* \* \* \*